UNITED STATES PATENT OFFICE.

OSCAR GERLACH, OF DANVILLE, ILLINOIS.

PROCESS FOR ECONOMIZING METALLIC REDUCTIONS.

1,313,287.     Specification of Letters Patent.     Patented Aug. 19, 1919.

No Drawing.     Application filed September 20, 1917. Serial No. 192,364.

*To all whom it may concern:*

Be it known that I, OSCAR GERLACH, a subject of the Emperor of Germany, and a resident of the city of Danville, in the county of Vermilion and State of Illinois, have invented certain new and useful Improvements in Processes for Economizing Metallic Reductions; and I do hereby declare that the following is a full, clear, and exact description of the same.

In the smelting of some metals, for example, zinc, the ore to be smelted is mixed with some form of carbon, for example, anthracite coal, and the mixture is heated in a retort. At the close of the reduction period, the carbon in the retort becomes coated with an exceedingly thin layer of the metal, usually in the form of a metallic oxid, this coating eventually rendering the carbon inert for reducing purposes. A large quantity of this unused carbon is left in the retort and because of such metallic coating, this excess carbon has been considered worthless for further use, and is thrown away, with consequent loss, not only of the value of the carbon, but, as well, the value of the metallic coating thereon, which has, of course, been lost.

The object of this invention is to utilize all the carbon, and recover the metal by reduction. In carrying out my invention, I usually grind or crush this carbon refuse lightly, thereby breaking or removing the thin layer of the metal oxid investing each carbon particle, thus presenting fresh surfaces of the carbon particles whereby the carbon particles again become active reducing material and may be used in the retort mixed with the fresh carbon.

My invention further consists in treating the ground carbon particles and the metal oxid broken therefrom, by the addition of suitable hydro-carbons such as tar, so that the original volatile carbons of the coal are replaced. When the mixture of the ground carbon particles, the metal oxid which has been broken therefrom, and the hydro-carbons are used as a retort fuel, the hydro-carbons are partly disintegrated by the heat, the pure carbon so released entering into a combination with the metal oxid which has heretofore prevented the use of the refuse. When reducing ore such as zinc and similar ores, the residue carbon which has been treated with tar may or may not be crushed as preferred.

Any suitable device may be used for grinding or crushing said residue, for example, a tube mill, and, of course, many other devices may be used for the purpose.

By the use of my process, it will be seen that the carbon content, that has heretofore been of little value and considered practically as refuse is saved and used to entire consumption in successive reductions, and, as well, much of the metal heretofore lost in this residue is recovered.

It will, of course, be understood that the refuse may be operated upon in any suitable type of machine for the purpose of separating the carbon contents of the refuse from the slag, to permit treatment of the coated carbon particles only instead of all of the refuse.

I claim as my invention:

1. The method of preparing carbon containing refuse from metal reducing retorts for further use for reduction by grinding the same to remove the metal oxid investment from the particles thereof.

2. The process of preparing the carbon containing refuse from metal reducing retorts for use in further metal ore reduction by lightly crushing the coated refuse to expose fresh carbon surfaces uncoated with metal or metallic oxid.

3. The process of preparing the carbon containing refuse from metal reducing retorts for use in further metal or reduction by first separating from the carbon particles thereof the metallic or metallic oxid layer or film deposited, and coating the materials so treated with a hydro-carbon.

4. The process of preparing the carbon containing refuse from metal reducing retorts for use in further metal ore reduction by lightly grinding the refuse to separate from the carbon containing particles thereof, the metallic or metallic oxid coating or film deposited thereon and coating the materials so treated with a tar.

5. The method of preparing carbon containing refuse from zinc reducing retorts for further use for reduction by grinding the same to remove the zinc oxid coating from the particles thereof.

6. The method of preparing carbon containing refuse from zinc reducing retorts for further use for reduction by grinding the same to remove the zinc oxid coating from the particles thereof and mixing the materials so treated with a carbonaceous binder.

In testimony whereof I have hereunto subscribed my name in the presence of two subscribing witnesses.

OSCAR GERLACH.

Witnesses:
LAWRENCE REIBSTEIN,
EARL M. HARDINE.

Copies of this patent may be obtained for five cents each, by addressing the "Commissioner of Patents, Washington, D. C."